United States Patent
Linke

(10) Patent No.: US 10,133,273 B2
(45) Date of Patent: Nov. 20, 2018

(54) LOCATION SPECIFIC ASSISTANCE FOR AUTONOMOUS VEHICLE CONTROL SYSTEM

(71) Applicant: 2236008 Ontario Inc., Waterloo (CA)

(72) Inventor: Scott Lee Linke, Irving, TX (US)

(73) Assignee: 2236008 Ontario Inc., Waterloo, Ontario (CA)

(*) Notice: Subject to any disclaimer, the term of this patent is extended or adjusted under 35 U.S.C. 154(b) by 0 days.

(21) Appl. No.: 15/271,170

(22) Filed: Sep. 20, 2016

(65) Prior Publication Data
US 2018/0081362 A1 Mar. 22, 2018

(51) Int. Cl.
| | | |
|---|---|---|
| *G05D 1/02* | (2006.01) | |
| *G06N 99/00* | (2010.01) | |
| *G05D 1/00* | (2006.01) | |
| *G08G 1/00* | (2006.01) | |

(52) U.S. Cl.
CPC ......... *G05D 1/0088* (2013.01); *G05D 1/0022* (2013.01); *G05D 1/0221* (2013.01); *G06N 99/005* (2013.01); *G08G 1/00* (2013.01); *G05D 2201/0213* (2013.01)

(58) Field of Classification Search
CPC .. G06N 99/005; G05D 1/0022; G05D 1/0088; G05D 1/0212; G05D 1/0221; G05D 1/0274; G05D 1/0293; G05D 1/0061; B60W 30/165; B60W 30/182
See application file for complete search history.

(56) References Cited

U.S. PATENT DOCUMENTS

| | | | |
|---|---|---|---|
| 8,139,109 B2 | 3/2012 | Schmiedel et al. | |
| 8,718,861 B1* | 5/2014 | Montemerlo | B60W 30/00 701/26 |
| 8,849,494 B1* | 9/2014 | Herbach | B60W 30/00 701/24 |
| 9,008,890 B1* | 4/2015 | Herbach | B60W 30/00 340/435 |

(Continued)

FOREIGN PATENT DOCUMENTS

WO  WO 2016/012901 A1  1/2016

OTHER PUBLICATIONS

"5G Automotive Vision," dated Oct. 20, 2015, pp. 1-67, White Paper, ERTICO ITS Europe, European Commission, 5GPPP.

(Continued)

*Primary Examiner* — Behrang Badii
*Assistant Examiner* — David A Testardi
(74) *Attorney, Agent, or Firm* — Trop, Pruner & Hu, P.C.

(57) ABSTRACT

Systems and methods to provide location specific assistance are presented. A condition at a geographic location may be identified that is sensed in an environment of a vehicle and that a first autonomous vehicle control system is unable to, without location specific assistance, perceive, interpret and/or react to if navigating an area. A course at the geographic location that was previously determined by a second autonomous vehicle control system and/or followed by a person-driven vehicle when the condition was present at the geographic location may be found. The vehicle may be caused to follow the course previously determined by a second autonomous vehicle control system and/or followed by the person-driven vehicle.

14 Claims, 3 Drawing Sheets

(56) References Cited

U.S. PATENT DOCUMENTS

| | | | |
|---|---|---|---|
| 9,037,337 B1* | 5/2015 | Cudak | G01C 21/26 701/23 |
| 9,147,353 B1 | 9/2015 | Slusar | |
| 9,465,388 B1* | 10/2016 | Fairfield | G05D 1/0044 |
| 9,511,764 B2* | 12/2016 | Pilutti | B60W 30/00 |
| 9,587,952 B1* | 3/2017 | Slusar | G06Q 10/00 |
| 9,625,264 B1* | 4/2017 | Imanishi | G01C 21/3638 |
| 9,671,782 B2* | 6/2017 | Yamaoka | G05D 1/0061 |
| 2004/0107042 A1* | 6/2004 | Seick | G08G 1/0104 701/117 |
| 2012/0083964 A1* | 4/2012 | Montemerlo | G05D 1/0214 701/26 |
| 2013/0151058 A1* | 6/2013 | Zagorski | B60W 30/09 701/23 |
| 2015/0012165 A1* | 1/2015 | Israelsson | G05D 1/021 701/23 |
| 2015/0166069 A1* | 6/2015 | Engelman | B60W 30/12 701/23 |
| 2015/0248131 A1* | 9/2015 | Fairfield | G05D 1/0044 701/2 |
| 2015/0314780 A1* | 11/2015 | Stenneth | B60W 30/00 701/23 |
| 2015/0353088 A1* | 12/2015 | Ishikawa | B60W 30/182 701/23 |
| 2016/0026182 A1 | 1/2016 | Boroditsky et al. | |
| 2016/0047660 A1* | 2/2016 | Fausten | B60W 50/12 701/25 |
| 2016/0167652 A1* | 6/2016 | Slusar | B60W 30/143 701/27 |
| 2017/0003681 A1* | 1/2017 | Ross | G05D 1/0022 |
| 2017/0072851 A1* | 3/2017 | Shenoy | B60Q 9/008 |
| 2017/0074667 A1* | 3/2017 | Laur | G01C 21/34 |
| 2017/0158191 A1* | 6/2017 | Bills | B60W 30/025 |
| 2017/0168504 A1* | 6/2017 | Darms | G05D 1/0212 |
| 2017/0197618 A1* | 7/2017 | Ali | B60W 30/12 |
| 2017/0203770 A1* | 7/2017 | Kondo | B60W 50/14 |
| 2017/0253241 A1* | 9/2017 | Filev | B60W 50/0097 |
| 2017/0261974 A1* | 9/2017 | Ebe | G05D 1/0005 |
| 2017/0329331 A1* | 11/2017 | Gao | G05D 1/0061 |

OTHER PUBLICATIONS

Wikipedia, "Autonomous car," dated Sep. 5, 2016, pp. 1-16, available at URL: https://en.wikipedia.org/wiki/Autonomous_car.

Gayowski, Lynn, "IoT-Enabled BlackBerry Radar Will Empower Truck Companies to Cut Theft, Boost Profits," dated Mar. 31, 2016, pp. 1-3, available at URL: http://blogs.blackberry.com/2016.103/iot-enabled-blckberry-radar-will-. . . .

U.S. Department of Transportation, National Highway Traffic Safety Administration, "Vehicle-to-Vehicle Communication Technology," dated Oct. 14, 2014, pp. 1-4, Fact Sheet No. 11078-101414-v2a.

International Search Report, dated Dec. 13, 2017, pp. 1-13, Issued in International Application No. PCT/US2017/052268, European Patent Office, Rijswijk, Netherlands.

* cited by examiner

LOCATION SPECIFIC ASSISTANCE FOR AUTONOMOUS VEHICLE CONTROL SYSTEM

TECHNICAL FIELD

This disclosure relates to control systems and, in particular, to autonomous vehicle control systems.

BACKGROUND

An autonomous vehicle may be a vehicle that is capable of sensing its environment and navigating without human input. Navigating may include determining where to guide the vehicle in response to objects the autonomous vehicle detects.

In the United States, the National Highway Traffic Safety Administration (NHTSA) released a formal classification system in 2013 for automated vehicle classification. NHTSA automated vehicle classifications included: Level 0: The driver completely controls the vehicle at all times. Level 1: Individual vehicle controls are automated, such as electronic stability control or automatic braking. Level 2: At least two controls can be automated in unison, such as adaptive cruise control in combination with lane keeping. Level 3: The driver can fully cede control of all safety-critical functions in certain conditions. The car senses when conditions require the driver to retake control and provides a "sufficiently comfortable transition time" for the driver to do so. Level 4: The vehicle performs all safety-critical functions for the entire trip, with the driver not expected to control the vehicle at any time. As this vehicle would control all functions from start to stop, including all parking functions, it could include unoccupied cars. Under this classification system, an autonomous vehicle includes an automated vehicle in levels 2, 3 and/or 4.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Autonomous vehicles may use detailed maps, which may be embodied as latitude, longitude and elevation databases, or which may use other coordinate or location systems. The detailed maps are helpful for route calculation and guidance systems. Control of autonomous vehicles may be more demanding in that the route is trivial in comparison to the amount of data and decisions required to control and maneuver the vehicle along any route. The autonomous vehicle control system may attempt to discern data that relates to both static conditions (e.g., road, lanes, ramps, and other structures) and dynamic conditions (e.g., vehicles in motion, pedestrians, and other transient conditions). One problem may be that apparently static conditions (such as roads) may be uncharacterized in some cases and/or not remain static over time. For example, road surfaces change (e.g., resurfaced, debris spill, and snow), the appearance of the road surfaces changes (e.g., wet vs dry, snow, snow plowed, and snow tracked), locations change (e.g., construction, accidents), lanes change (e.g., construction and obstacles). The autonomous vehicle control systems may infer such changes (e.g., traffic congestion, road closing) by tracking GPS (Global Positioning Satellite) or other location data (e.g., coordinates, speed), but situations will arise where an autonomous vehicle needs more information than route efficiency metrics. For example, route avoidance may not be an option and the ability to drive through the new/changing conditions may be desirable. A sudden hand off to a human driver may also not be desirable.

In such situations, real time data on the altered state of the road or path and how to interpret the new state may be collected and provided to vehicles whose route includes the road or path. Such data may be in the context of spatial and/or visual information that may match what a vehicle encounters given the sensory inputs (for example, camera and/or radar).

Vision and radar systems may be used for controlling individual features such as adaptive cruise control, forward crash avoidance, and lane departure. Sensors may be assigned to a function and tailored to satisfy the function within individual control modules. In some autonomous vehicle control systems, all or multiple sensors are brought to a single control module that performs multiple functions concurrently. A system for providing location specific assistance to autonomous vehicle control systems may, for example, collect visual (e.g., camera) and spatial (e.g., stereo camera, structure from motion camera, radar, and lidar) data while a vehicle is in motion, and transmit such information to a remote computing facility for processing. The autonomous vehicle control system may use the collected visual and spatial sensors data for real time decisions concerning a vehicle's current and future behavior.

Figure 1:
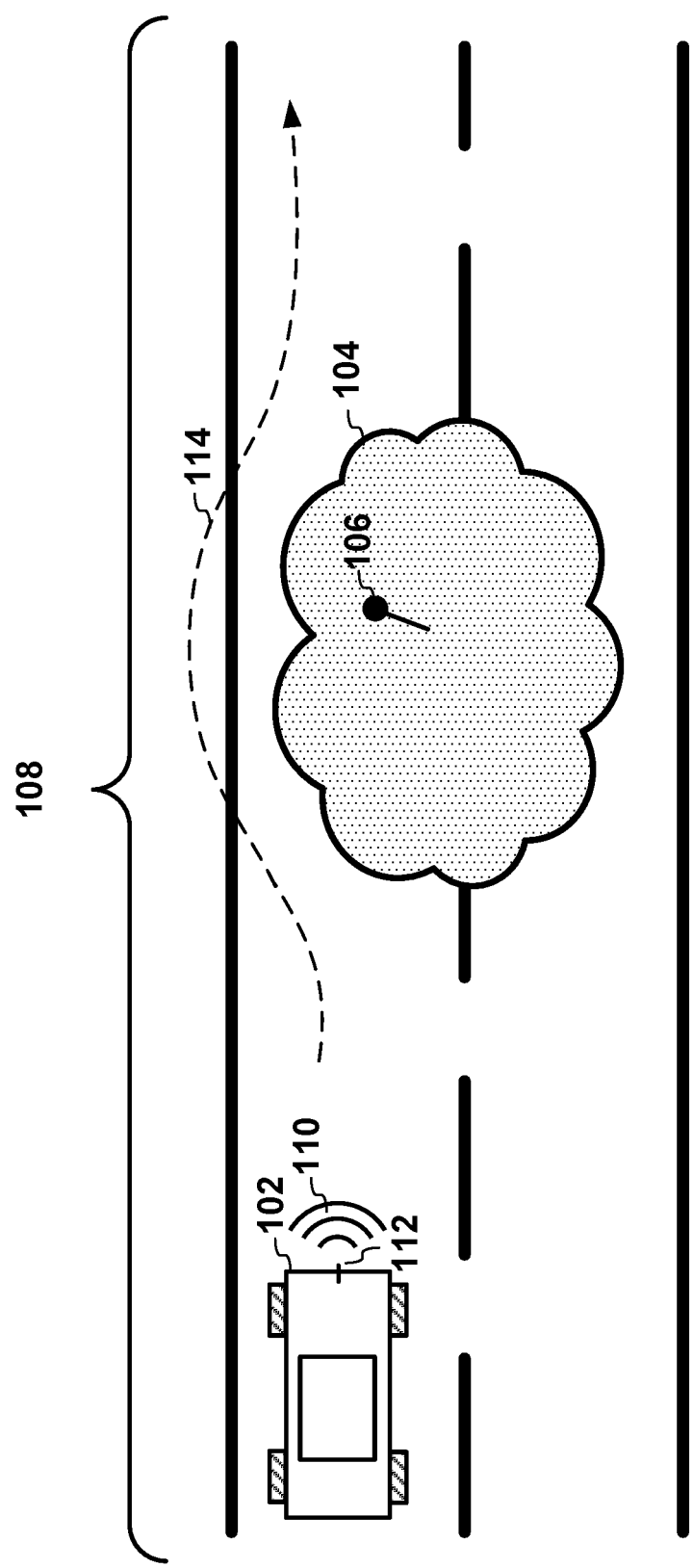
FIG. 1 illustrates an example scenario where an autonomous vehicle control system receives location specific assistance.

FIG. 1 illustrates an example scenario where an autonomous vehicle control system receives location specific assistance. Generally speaking, in order to navigate an area 108, the autonomous vehicle control system may perceive, interpret, and/or react to an environment 110 of the vehicle 102 sensed by one or more sensors 112. In the scenario illustrated in FIG. 1, the autonomous vehicle control system may receive location specific assistance if a vehicle 102 encounters a condition 104 at a geographic location 106 that would otherwise (1) prevent the autonomous vehicle control system from navigating an area 108 and/or (2) cause a confidence level, which the autonomous vehicle control system has in navigating the area 108, to drop below a threshold level.

The condition 104 at the geographic location 106 may be any condition that—without location specific assistance—(1) prevents the autonomous vehicle control system from navigating the area 108 and/or (2) causes a confidence level, which the autonomous vehicle control system has in navigating the area 108, to drop below a threshold level. Alternatively or in addition, the condition 104 may be any condition that is outside the ability of the autonomous vehicle control system to perceive, interpret and/or react to if navigating the area 108 without location specific assistance. Examples of the condition 104 may include snow covered lane markings, unmarked lanes during construction, a flag person, a car accident, a chemical spill across all lanes of a road, a stop sign installed next to a road without an intersection or other structure necessitating a stop sign, and unrecognizable signage. The condition 104 may include data patterns that are erroneous, illegitimate, conflicting, and/or to be ignored. For example, glare from a structure near a road may cause the sensor 112 to return erroneous information. The condition 104 may be represented by visual and/or spatial data obtained from the one or more sensors 112.

The visual and/or the spatial data that represent the condition 104 may not have been properly perceived or interpreted by the autonomous vehicle control system. Accordingly, in some situations, the autonomous vehicle control system may not know what the condition 104 actually is and instead the condition 104 includes the representation of it in the form of the visual and/or spatial data. The condition 104 is likely to be an unusual condition because the autonomous vehicle control system probably will be able to perceive, interpret and/or react to common conditions. However, the condition 104 does not necessarily have to be unusual.

Location specific assistance may be provided to the autonomous vehicle control system if the condition 104 is encountered. Location specific assistance may be provided by finding—and then following—a course 114 that a person previously followed when the condition 104 was detected at the geographic location 106. For example, the person may have driven a vehicle along the course 114 after one or more sensors on the person-driven vehicle detected the condition 104 at the geographic location 106. The person-driven vehicle may have been a different vehicle than the vehicle 102 controlled by the autonomous vehicle control system. Alternatively, the person-driven vehicle may have been the same vehicle as the vehicle 102 now controlled by the autonomous vehicle control system. Regardless, a system for the person-driven vehicle may have determined that the detected condition 104 is a condition that the autonomous vehicle control system would—at least without location specific assistance—(1) prevent the autonomous vehicle control system from navigating the area 108 and/or (2) cause a confidence level, which the autonomous vehicle control system has in navigating the area 108, to drop below a threshold level. In some examples, the system for the person-driven vehicle may not have made such a determination.

The person-driven vehicle and/or the system for the person-driven vehicle, may cause information about the course 114, the detected condition 104, and the geographic location 106 to be available for later use by the autonomous vehicle control system that is to receive the location specific assistance. The information may be made available by, for example, Vehicle-to-Everything (V2X) communication. V2X communication may be any communication involving a vehicle as a source or destination of a message. Examples of V2X communication may include Vehicle-to-Vehicle (V2V), Vehicle-to-Infrastructure (V2I) (for example, road infrastructure, which may or may not be co-located with cellular infrastructure), Vehicle-to-Network (V2N) (for example, a backend and/or the Internet), and Vehicle-to-Pedestrian (V2P) communication. For example, the information may be made available by transmitting information about the course 114, the detected condition 104, and the geographic location 106 to a remote processing facility from the vehicle 102. Alternatively or in addition, the information may be made available by storing the information in a memory of the person-driven vehicle for later use by an autonomous vehicle control system of the person-driven vehicle.

As indicated above, the location specific assistance may be provided by finding and following the course 114 that the person-driven vehicle previously followed when the condition 104 was detected at the geographic location 106. The course 114 may be found by searching for the condition 104 and the geographic location 106 of the condition 104 in a database of the information that was made available by the system for the person-driven vehicle. Alternatively or in addition, the course 114 may be found by searching for the condition 104 and the geographic location 106 of the condition 104 in a database of information made available by multiple vehicles.

If a match with the condition 104 and the geographic location 106 of the condition 104 is found, then the autonomous vehicle control system may direct the vehicle 102 to follow the course 114.

In some examples, the entries in the database of information relating to conditions, the respective geographic locations of the conditions, and the courses the person-driven vehicle followed may expire. In other words, if the person-driven vehicle followed the course 114 too long ago (in other words, the corresponding entries in the database have expired), then the course may not be followed and/or found. Alternatively, the course may be followed, but only if a human approves doing so. A course may expire if the course was followed outside a predetermined time period or a threshold time period, for example.

Alternatively or in addition, the course 114 may be followed in some examples only if the person who previously followed the course 114 is trusted and/or the course 114 is trusted.

The trust may be formed using any trust mechanism. For example, the person may be pre-qualified as a trusted driver. As another example, the course 114 may be trusted if a minimum number of people previously followed the course 114 in the presence of the condition 104 at the geographic location 106.

Figure 2:
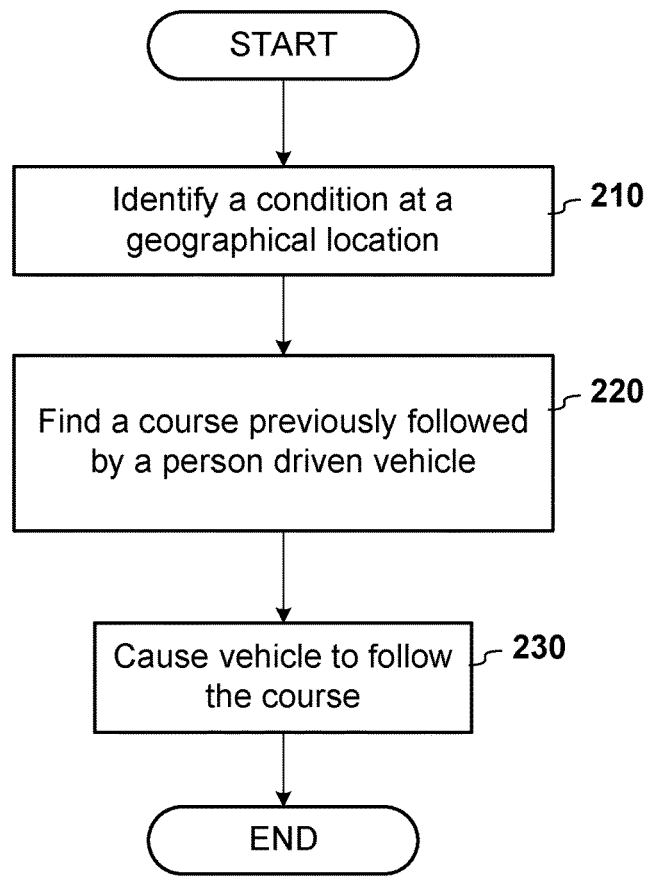
FIG. 2 illustrates a flow diagram of logic of an example system to provide location specific assistance to an autonomous vehicle control system.

FIG. 2 illustrates a flow diagram of logic of an example system to provide location specific assistance to an autonomous vehicle control system. The operations may include additional, different, or fewer operations than illustrated in FIG. 2. The operations may be executed in a different order than illustrated in FIG. 2.

Operations may begin with the condition 104 being identified (210) at the geographic location 106 that is sensed in the environment 110 of the vehicle 102 and that, without location specific assistance, prevents an autonomous vehicle control system from navigating the area 108 that includes the geographic location 106 and/or causes a confidence level, which the autonomous vehicle control system has in navigating the area 108, to fall below a threshold level. For example, the condition 104 may be identified (210) by receiving an indication from the autonomous vehicle control system that the condition 104 prevents the autonomous vehicle control system from navigating the area 108 that includes the geographic location 106. Alternatively or in addition, the condition 104 may be identified (210) by determining that the condition 104, without location specific assistance, prevents the autonomous vehicle control system from navigating the area 108 and/or causes the confidence level to fall below the threshold level.

The course 114 previously followed by a person-driven vehicle when the condition 104 was present at the geographic location 106 may be found (220). For example, the course 114 may be found (220) by searching a database of conditions and geographic locations for a match with the condition 104 at the geographic location 106.

After the course 114 is found, the vehicle 102 may be caused (230) to follow the course 114 that was previously followed by the person-driven vehicle. Operations may end by, for example, waiting until an additional condition is encountered by the vehicle 102 that requires location specific assistance in order to navigate further.

Figure 3:
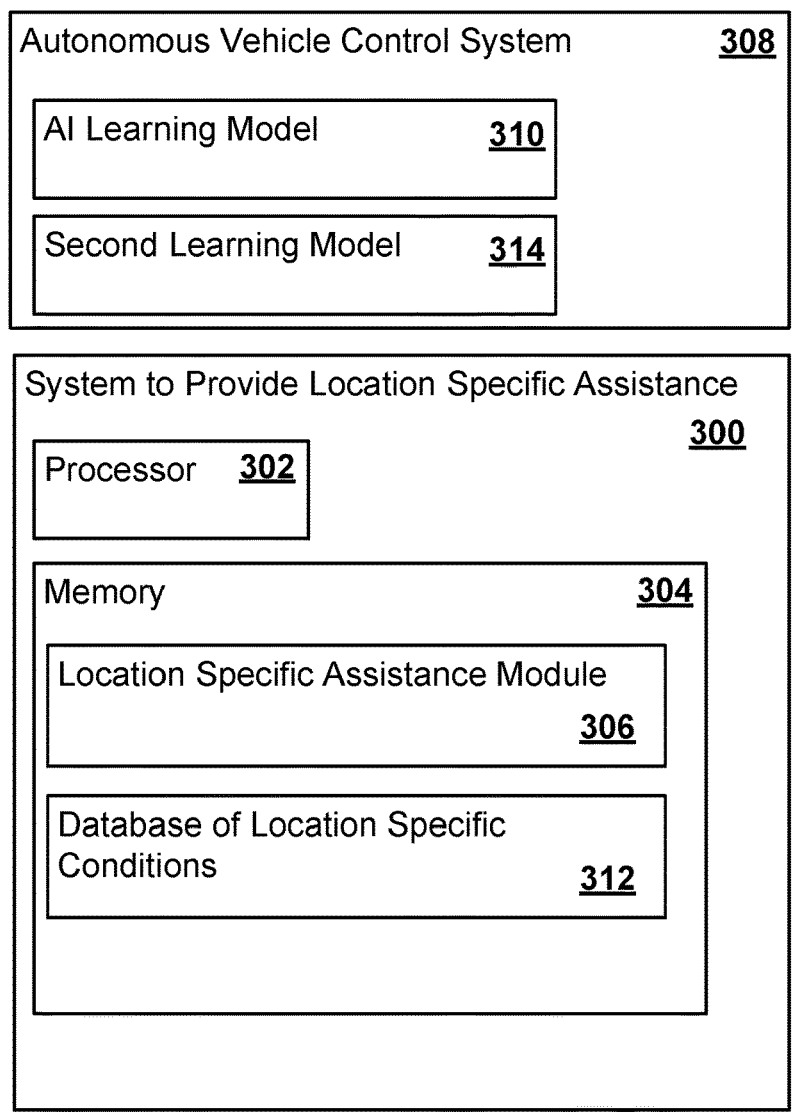
FIG. 3 illustrates an example of a system to provide location specific assistance to an autonomous vehicle control system.

FIG. 3 illustrates an example of a system 300 to provide location specific assistance to an autonomous vehicle control system 308. The system 300 may include a processor 302 and a memory 304. The memory 304 may include a location specific assistance module 306 and a database 312 of location specific conditions.

The processor 302 may be in communication with the memory 304. In some examples, the processor 302 may also be in communication with additional elements, such as the one or more sensors 112. Examples of the processor 302 may include a general processor, a central processing unit, a microcontroller, a server, an application specific integrated circuit (ASIC), a digital signal processor, a field programmable gate array (FPGA), a digital circuit, and/or an analog circuit.

The processor 302 may be one or more devices operable to execute logic. The logic may include computer executable instructions or computer code embodied in the memory 304 or in other memory that when executed by the processor 302, cause the processor 302 to perform the features implemented by the logic. The computer code may include instructions executable with the processor 302.

The memory 304 may be any device for storing and retrieving data or any combination thereof. The memory 304 may include non-volatile and/or volatile memory, such as a random access memory (RAM), a read-only memory (ROM), an erasable programmable read-only memory (EPROM), and/or flash memory. Alternatively or in addition, the memory 304 may include an optical, magnetic (hard-drive) or any other form of data storage device.

The location specific assistance module 306 may be any module configured with the logic of the system 300 to provide location specific assistance to the autonomous vehicle control system 308.

The database 312 of location specific conditions may be any type of data storage structure. The database 312 may include, for example, the information relating to conditions, the respective geographic locations of the conditions, and/or the courses that person-driven vehicles followed when autonomous vehicle control systems were unable to navigate areas that include the conditions. For example, the database 312 may include information describing the condition 104, the geographic location 106, and the course 114 illustrated in FIG. 1.

The autonomous vehicle control system 308 may be any control system configured to navigate an area, such as the area 108 illustrated in FIG. 1, without human input. The autonomous vehicle control system 308 may be configured to perceive, interpret, and/or react to the environment 110 of the vehicle 102 sensed by the one or more sensors 112 without human input. The autonomous vehicle control system 308 may be configured to steer the vehicle 102 without human input. The autonomous vehicle control system 308 may be configured to determine how to steer and/or otherwise control the vehicle based on an artificial intelligence learning model 310.

Examples of the artificial intelligence learning model 310 may include a neural network, a deep learning neural network, and/or any other machine learning structure configured to detect patterns based on training data. The artificial intelligence learning model 310, once trained, may detect road conditions, objects, and/or any other conditions. The artificial intelligence model 310 may be trained with training data to detect, identify, and/or classify detected objects. For example, an object may be identified by the model 310 as a sign and then classified as a stop sign. As another example, an object may be identified by the model 310 as a human and then classified as not being a picture of a human. The model 310 may be global in that the model 310 may have been trained to cover a broad and comprehensive range of anticipated driving environments and/or conditions. Alternatively or in addition, the model 310 may be localized by being trained with data from environments found within a specific geographic region or area, such as the area 108 illustrated in FIG. 1. Alternatively or in addition, the model 310 may have a temporal component so that the model 310 may have a usefulness that is time bound, such as between a start time and a stop time. The model 310 may include one or more machine learning structures, each configured to detect patterns based on training data.

In some examples, the inability of the autonomous vehicle control system 308 to navigate the area 108 (or its confidence level falling below a threshold level) may be solved by receiving and/or acquiring a second learning model 314 (one or more learning models) which overcomes the inability. In other words, location specific assistance may be provided by the autonomous vehicle control system 308 receiving and/or acquiring the second learning model 314. The second learning model 314 may, in some cases, have a temporal component so as to limit the timeframe in which the autonomous vehicle control system 308 may use the second learning model 314. The artificial intelligence learning model 310 (the first learning model 310) of the autonomous vehicle control system 308 may include a global model for managing lane position, where the model 310 detects lane markings and/or other relevant objects. However, in some examples, the lane position must be determined by calculating a path for the vehicle 102 to follow based on the model 310 detecting an atypical object and/or an object in an atypical location, such as the condition 104 in FIG. 1 (for the example that follows below, trees, mail boxes, and or any other objects unique to the geographical location 106). The second learning model 314 may include a learning model that is additionally or specifically trained with the condition 104, the geographic location 106 of the condition 104, and/or the course 114 followed by the person drive vehicle. Alternatively or in addition, the second learning model 314 may include a learning model that is additionally or specifically trained with the information in the database 312 of location specific conditions. The autonomous vehicle control system 308 may navigate the area 108 by applying the second learning model 314 if the vehicle is in the area 108. If the vehicle leaves the area 108, then the autonomous vehicle control system 308 may navigate by applying the first learning model 310. Alternatively or in addition, if the second learning model 314 has a temporal component, then the autonomous vehicle control system 308 may navigate by applying the first learning model 310 outside of the timeframe in which the autonomous vehicle control system 308 may use the second learning model 314.

The system 300 to provide location specific assistance may generate the second learning model 314. Alternatively or in addition, the autonomous vehicle control system 308 or any other system may generate the second learning module.

In some examples, the second learning model 314 may have higher computational demands than the first learning model 310. To make an analogy to a situation encountered by a human, consider a human driving in an atypical situation, such as during and/or immediately after a snowstorm. During the snowstorm, the human may be judging lane position relative to landmarks and/or correlating lane position to existing wheel tracks. Cognitive intensity may be relatively high until the human encounters an "easier" condition, such as a plowed road, which still may not have visible lane markers, but the plowed road may have more "easily" recognized borders. The second learning model 314 may be applied during the atypical situations, but once the vehicle 102 encounters conditions within the standard abilities of the autonomous vehicle control system 308, the first learning model 310 may be applied.

If the second learning model 314 has computational demands, the autonomous vehicle control system 308 may slow the vehicle 102 in order to give itself time to apply the second learning model 314. Alternatively or in addition, a separate system located in the vehicle 102 or a system located over a communications network in a remote computing facility may apply the second learning model 314.

Each component may include additional, different, or fewer components. For example, the location specific assistance module 306 may include multiple modules. Similarly, the memory 304 may include multiple modules. Alternatively or in addition, the memory 304 may not include the database 312 of information relating to conditions, the respective geographic locations of the conditions, and/or the courses that person-driven vehicles followed. The database 312 of location specific information may be included, for example, in the remote computing facility.

The system 300 may be implemented with additional, different, or fewer components. For example, the system 300 may include communications hardware (not shown) for communicating with other vehicles, with the autonomous vehicle control system 308, and/or with a remote computing facility. For example, the remote computing facility may include the database 312 of information relating to conditions, the respective geographic locations of the conditions, and/or the courses that person-driven vehicles followed. In some examples, the system 300 to provide location specific assistance may be included in, or may include, the autonomous vehicle control system 308.

In some examples, the remote computing facility may process the data according to a variable set of learning models as determined by the remote computing facility. Variations may be based on weather, traffic density, the number of collectors on the same roadway as well as other conditions. Correlating collected data to the recording vehicle's physics (such as its geographic location) enables the ability to remotely process and determine how existing road conditions differ from an expected norm or previously encountered conditions. For example, a system in the remote facility may be able to apply a wider variety of learning models to the same input data than the autonomous vehicle control system 308 in the vehicle 102 due to the remote facility system's potentially greater computing power. For example, the second learning model 314 may be part of a larger set of learning models that is used to identify and/or classify unexpected conditions. Alternatively or in addition, the first learning model 310 may be part of the set of learning models in the remote facility. The first learning model 310 in the remote facility may be used to verify that the first learning model 310 in the autonomous vehicle control system 308 is operating properly. In some examples, the system in the remote facility may generate a global and/or localized (static or temporal) learning model update that is propagated to the autonomous vehicle controls system 308 in the vehicle.

The system 300 may be implemented in many different ways. Each module, such as the location specific assistance module 306, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 304, for example, that comprises instructions executable with the processor 302 or other processor to implement one or more of the features of the module. When any one of the module includes the portion of the memory that comprises instructions executable with the processor, the module may or may not include the processor. In some examples, each module may just be the portion of the memory 304 or other physical memory that comprises instructions executable with the processor 302 or other processor to implement the features of the corresponding module without the module including any other hardware. Because each module includes at least some hardware even when the included hardware comprises software, each module may be interchangeably referred to as a hardware module, such as the location specific assistance module hardware module.

Some features are shown stored in a computer readable storage medium (for example, as logic implemented as computer executable instructions or as data structures in memory). All or part of the system 300 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 300 may be distributed among multiple entities, such as among multiple processors and memories, optionally including multiple distributed processing systems. For example, one or more components of the system 300 may be included in a remote server, in the cloud, and/or on a Network-attached storage (NAS). Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors.

The vehicle 102 illustrated in FIG. 1 is shown as a car. However, the vehicle 102 may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising.

The geographic location 106 may comprise GPS coordinates. Alternatively or in addition, the geographic location 106 may include any other indication of the geographic location 106. The geographic location 106 may comprise a point, an area, or even a volume.

The area 108 illustrated in FIG. 1 comprises a segment of a road. However, the area 108 to be navigated by the vehicle 102 may be any other type of area or space. For example, the area 108 may comprise a portion of air space that a drone is to navigate.

The phrase "human-driven" or "person-driven" means human controlled. For example, the person-driven vehicle may comprise a car, a truck, a motorcycle, a boat, a plane, a helicopter, a drone, or any other type of vehicle. The human may or may not be in the person-driven vehicle when controlling the vehicle.

The environment 110 of the vehicle 102 may be the area in front of the vehicle 102 (for example, in the direction of travel). Alternatively or in addition, the environment 110 may include any area around the vehicle 102, such as right, left, behind, above, and/or below. The environment 110 of the vehicle 102 may include an area that is within range of sensors on the vehicle 102.

Examples of the one or more sensors 112 may include a camera, a microphone, a stereo camera, a motion camera, a radar, and/or a lidar. Alternatively or in addition, the one or more sensors 112 may include any other type of sensors.

The course 114 may include an indication of a route or a path. Alternatively or in addition, the course may include an indication of speed, acceleration, and/or any other physical characteristics of the route or manner in which the route was traversed. When the course 114 is followed, that may mean in some examples that the speed, acceleration, and/or other physical characteristics are reproduced.

As described above, location specific assistance may be provided by finding and following the course 114 that a person-driven vehicle previously followed when the condition 104 was detected at the geographic location 106. Alternatively or in addition, location specific assistance may be provided by finding and following the course 114 that a second autonomous vehicle control system determined when the condition 104 was detected at the geographic location 106. Disparate autonomous vehicle control systems from different manufacturers—and even different versions from a single manufacturer—may have differing abilities. As a result, the course 114 may be determined by the second autonomous vehicle control system even if the first autonomous vehicle control system 308 was unable or not confident enough to find the course 114. The database 312 may include, for example, the information relating to conditions, the respective geographic locations of the conditions, and/or the courses that vehicles controlled by the second autonomous vehicle control system followed when such vehicles encountered the conditions. Alternatively or in addition, the database 312 may include the information relating to conditions, the respective geographic locations of the conditions, and/or the courses that person-driven vehicles followed when autonomous vehicle control systems were unable to navigate areas that include the conditions.

If the course 114 was able to be determined by the second autonomous vehicle control system but not by the first autonomous vehicle control system 308, a need for an update of the learning model of the first autonomous vehicle control system 308 or for localized support through the second learning model 314 may be identified. As systems age, their ability to rely on global learning models may be eroded because their reactions become troublesome for more recent systems: for example, an older system may take an evasive maneuver when faced with the condition 104, but a newer system may recognized the condition 104 as benign or of moderate risk. Even if an older system is unaware of any issue with the older system's navigation abilities, the older system may be posing a risk for others. The older system may be identified to surrounding local vehicles as a risk. The newer systems controlling the surrounding local vehicles may receive an update to improve their ability to deal with the older system.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In some examples, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system to provide location specific assistance, the system comprising:
   a processor configured to:
   identify a condition at a geographic location that is sensed in an environment of a vehicle and that a first autonomous vehicle control system is unable to navigate past without location specific assistance;
   find a course at the geographic location that was at least one of: determined by a second autonomous vehicle control system or followed by a person-driven vehicle when the condition was present at the geographic location; and
   cause the vehicle to follow the course.

2. The system of aspect 1 wherein the course is found via an application of a learning model trained with training data comprising a condition matching the condition identified at the geographic location.

3. The system of any of aspects 1 to 2 wherein the learning model trained with the training data is available only inside a limited timeframe.

4. The system of any of aspects 1 to 3 wherein the first autonomous vehicle control system is unable to navigate past the condition without location specific assistance if the first autonomous vehicle control system indicates that the first autonomous vehicle control system is unable, without location specific assistance, to at least one of perceive, interpret or react to the condition.

5. The system of any of aspects 1 to 4, wherein the condition is identified in response to a determination that the first autonomous vehicle control system is unable, without location specific assistance, to at least one of perceive, interpret or react to the condition.

6. The system of any of aspects 1 to 5, wherein the course is found if the course at the geographic location was at least one of: determined by the second autonomous vehicle control system or followed by the person-driven vehicle within a threshold time period of when the condition is identified.

7. The system of any of aspects 1 to 6, further comprising a second learning model trained with a database of location specific conditions, the database populated with data from at least one of person-driven vehicles or vehicles controlled by the second autonomous vehicle control system, wherein the processor is configured to find the course based on an application of the second learning model to the condition identified at the geographic location.

8. An autonomous vehicle, the vehicle comprising:
   a processor configured to:
   identify a condition at a geographic location that is sensed in an environment of a vehicle and that a first autonomous vehicle control system is unable to navigate past without location specific assistance;
   find a course at the geographic location that was at least one of: determined by a second autonomous vehicle control system or followed by a person-driven vehicle when the condition was present at the geographic location; and
   cause the vehicle to follow the course previously determined by a second autonomous vehicle control system and/or followed by the person-driven vehicle.

9. The autonomous vehicle of aspect 8 wherein the course is found via a search of a database of conditions and geographic locations for a match with the condition at the geographic location.

10. The autonomous vehicle of aspect 9 wherein the database is on a server remotely located with respect to the vehicle.

11. The autonomous vehicle of any of aspects 8 to 10, wherein the first autonomous vehicle control system is unable to navigate past the condition without location specific assistance if the first autonomous vehicle control system indicates that the first autonomous vehicle control system is unable, without location specific assistance, to at least one of perceive, interpret or react to the condition.

12. The autonomous vehicle of any of aspects 8 to 11, wherein the condition is identified in response to a determination that the first autonomous vehicle control system is unable, without location specific assistance, to at least one of perceive, interpret or react to the condition.

13. The autonomous vehicle of any of aspects 8 to 12, wherein the course is found if the course at the geographic location was followed by the person-driven vehicle within a threshold time period of when the condition is identified.

14. The autonomous vehicle of any of aspects 8 to 13, further comprising a database of conditions, geographic locations, and courses, the database populated with data from person-driven vehicles, wherein the processor is configured to find the course via a search of the database.

15. A method comprising:
   identifying a condition at a geographic location that is sensed in an environment of a vehicle and that, without location specific assistance, is determined to at least one of:
   prevent a first autonomous vehicle control system from navigating an area that includes the geographic location or
   cause a confidence level, which the first autonomous vehicle control system has in navigating the area, to fall below a threshold level;
   finding a course at the geographic location that was at least one of: determined by a second autonomous vehicle control system or followed by a person-driven vehicle when the condition was present at the geographic location; and
   causing the vehicle to follow the course at the geographic location.

16. The method of aspect 15 wherein finding the course includes searching a database of conditions and geographic locations for a match with the condition at the geographic location.

17. The method of aspect 16 wherein the database is on a server remotely located with respect to the vehicle.

18. The method of any of aspects 15 to 17, wherein identifying the condition comprises receiving an indication from the autonomous vehicle control system that the condition at least one of: prevents the first autonomous vehicle control system from navigating the area that includes the geographic location or causes the confidence level to fall below the threshold level.

19. The method of any of aspects 15 to 18, wherein identifying the condition comprises determining that the condition, without location specific assistance, prevents the autonomous vehicle control system from navigating an area that includes the geographic location.

20. The method of any of aspects 15 to 19, wherein finding the course comprises finding the course at the geographic location previously followed by a person-driven vehicle within a threshold time period.

21. A computer readable storage medium comprising computer executable instructions, the computer executable instructions executable by a processor, the computer executable instructions comprising:
  instructions executable to identify a condition at a geographic location that is sensed in an environment of a vehicle and that, without location specific assistance, at least one of:
    prevents a first autonomous vehicle control system from navigating an area that includes the geographic location or
    causes a confidence level, which the first autonomous vehicle control system has in navigating the area, to fall below a threshold level;
  instructions executable to find a course at the geographic location that was at least one of: determined by a second autonomous vehicle control system or followed by a person-driven vehicle when the condition was present at the geographic location; and
  instructions executable to cause the vehicle to follow the course.

What is claimed is:

1. A system to provide location specific assistance, the system comprising:
  a processor configured to:
    determine with a first autonomous vehicle control system how to navigate a first vehicle based on a first artificial intelligence learning model supplied with first sensor data from at least one sensor of the first vehicle;
    receive a second artificial intelligence learning model in response to a failure of the first autonomous vehicle control system to determine how to navigate the first vehicle past a condition present at a geographic location based on the first artificial intelligence learning model, the second artificial intelligence learning model is usable for a predetermined timeframe, the second artificial intelligence learning model trained with second sensor data collected when the condition was present at the geographic location and a course past the condition was determined by a second autonomous vehicle control system and/or followed by a person-driven vehicle;
    find the course based on an application of the second artificial intelligence learning model within the predetermined timeframe to third sensor data sensed in an environment of the first vehicle at the geographic location; and
    cause the first vehicle to follow the course.

2. The system of claim 1 wherein the course is found if the course at the geographic location was within a threshold time period of when the condition is identified.

3. The system of claim 1 wherein the second artificial intelligence learning model is trained with a database of location specific conditions, the database is populated with data from at least one of person-driven vehicles or vehicles controlled by the second autonomous vehicle control system.

4. An autonomous vehicle, the autonomous vehicle comprising:
  a processor configured to:
    determine that, due to a condition at a geographic location sensed in an environment of the autonomous vehicle, a first autonomous vehicle control system, based on a first artificial intelligence learning model, is unable to cause the autonomous vehicle to navigate past the condition;
    receive a second artificial intelligence learning model in response to a determination that the first autonomous vehicle control system is unable to cause the autonomous vehicle to navigate past the condition at the geographic location, the second artificial intelligence learning model only usable for a predetermined timeframe, the second artificial intelligence learning model specifically trained with information collected when the condition was present at the geographic location and a course past the condition was determined by a second autonomous vehicle control system and/or followed by a person-driven vehicle;
    find the course at the geographic location based on the second artificial learning model; and
    cause the autonomous vehicle to follow the course previously determined by the second autonomous vehicle control system and/or followed by the person-driven vehicle.

5. The autonomous vehicle of claim 4 wherein the course is found via a search of a database of conditions and geographic locations for a match with the condition at the geographic location.

6. The autonomous vehicle of claim 5 wherein the database is on a server remotely located with respect to the autonomous vehicle.

7. The autonomous vehicle of claim 4 wherein the first autonomous vehicle control system is unable to navigate past the condition if the first autonomous vehicle control system indicates that the first autonomous vehicle control system is unable to at least one of perceive, interpret, or react to the condition.

8. The autonomous vehicle of claim 4, wherein the condition is identified in response to a determination that the first autonomous vehicle control system is unable to at least one of perceive, interpret or react to the condition.

9. The autonomous vehicle of claim 4 wherein the course is found if the course at the geographic location was followed by the person-driven vehicle within a predetermined time period of when the condition is identified.

10. The autonomous vehicle of claim 4 comprising a database of conditions, geographic locations, and courses, the database populated with data from person-driven vehicles, wherein the processor is configured to find the course via a search of the database based on a match of the condition.

11. A method comprising:
  determining a condition at a geographic location that is sensed in an environment of a vehicle, the condition preventing a first autonomous vehicle control system, which is based on a first artificial learning model, from navigating an area that includes the geographic location, and/or the condition causing a confidence level of the first autonomous vehicle control system in navigating the area to fall below a threshold level;

receiving a second artificial intelligence learning model usable for a predetermined timeframe, the second artificial intelligence learning model trained with sensor data collected when the condition was present at the geographic location and a course past the condition was determined by a second autonomous vehicle control system and/or followed by a person-driven vehicle;

finding the course at the geographic location based on application of the second artificial intelligence learning model; and causing the vehicle to follow the course at the geographic location past the condition.

12. The method of claim 11 wherein the determining comprises receiving an indication from the first autonomous vehicle control system that the condition prevents the first autonomous vehicle control system from navigating the area that includes the geographic location and/or causes the confidence level to fall below the threshold level.

13. The method of claim 11 wherein finding the course comprises finding the course at the geographic location previously followed by the person-driven vehicle within a threshold time period.

14. A non-transitory computer readable storage medium comprising computer executable instructions executable by at least one processor to:

determine a condition at a geographic location that is sensed in an environment of a vehicle, the condition preventing a first autonomous vehicle control system, which is based on a first artificial learning model, from navigating an area that includes the geographic location, and/or the condition causing a confidence level of the first autonomous vehicle control system in navigating the area to fall below a threshold level;

receive a second artificial intelligence learning model usable for a predetermined timeframe, the second artificial intelligence learning model trained with sensor data collected when the condition was present at the geographic location and a course past the condition was determined by a second autonomous vehicle control system and/or followed by a person-driven vehicle;

find the course at the geographic location based on application of the second artificial intelligence learning model; and cause the vehicle to follow the course past the condition.

* * * * *